United States Patent

Greskamp

[15] 3,697,824
[45] Oct. 10, 1972

[54] CAPACITOR HAVING AN ANCHORING SPIKE

[72] Inventor: John B. Greskamp, Indianapolis, Ind.

[73] Assignee: P. R. Mallory & Co., Inc., Indianapolis, Ind.

[22] Filed: Nov. 4, 1971

[21] Appl. No.: 195,738

[52] U.S. Cl. ................................. 317/230, 317/260
[51] Int. Cl. ........................................... H01g 9/06
[58] Field of Search .............. 317/230, 231, 233, 260

[56] References Cited

UNITED STATES PATENTS

| | | | |
|---|---|---|---|
| 2,758,259 | 8/1956 | Peck | 317/230 |
| 2,856,570 | 10/1958 | Peck | 317/230 |
| 3,214,649 | 10/1965 | Clargo et al. | 317/230 |
| 3,439,234 | 4/1969 | Braiman et al. | 317/230 |

*Primary Examiner*—James D. Kallam
*Attorney*—Richard H. Childress et al.

[57] ABSTRACT

An electrolytic capacitor is described having an anchoring spike between the capacitor body and the capacitor seal which stabalizes the capacitor body from movement with respect to the capacitor container and also provides adequate space for gas expansion in the device. A thermally conductive medium such as tar or asphalt material is preferably used in the bottom of the container to provide additional anti-vibration stabalization and thermal conductivity for removing heat from the capacitor body out through the capacitor container.

12 Claims, 3 Drawing Figures

PATENTED OCT 10 1972 3,697,824

INVENTOR
JOHN B. GRESKAMP
BY
Henry W. Cummings
ATTORNEY

CAPACITOR HAVING AN ANCHORING SPIKE

BACKGROUND OF THE INVENTION

Many electrolytic capacitors are subjected to greater or less amounts of mechanical vibration. One example involving particularly high vibration is paint spraying apparatus. The vibrations are often three to ten times greater than that in the typical AC motor start application. In the AC motor start application the standard way of avoiding damage to the capacitor due to vibration is to place tar or asphalt in the bottom of the capacitor body. However, for application subjected to greater vibrations such as paint spray apparatus, additional anti-vibratory structure has been found to be necessary.

Electrolytic capacitors also require space for gas expansion so that the capacitor may gradually discharge gases built up as a result of operation, rather than exploding.

Another important requirement is the thermal conductivity. As the devices heat up, the heat must be dissipated out through the capacitor container. While tar is not the greatest material for thermal conductivity, its thermal conductivity is much higher than that of air. Thus constructions utilizing bottom plugs, such as in U.S. Pat. Nos. 2,856,570 and 2,758,259, have not been satisfactory from the standpoint of thermal conductivity.

SUMMARY OF THE INVENTION

It is an object of the present invention to provide a capacitor which will withstand increased amounts of vibration.

It is another object of the present invention to provide a capacitor which has sufficient thermal conductivity to remove heat generated during operation.

It is another object of the present invention to provide a capacitor construction which includes the use of a thermally conductive, anti-vibratory medium in the bottom portion of the device together with additional anti-vibration structure.

It is another object of the present invention to provide a capacitor construction which allows for gas expansion during operation.

Other objects will be apparent from the following description and drawings.

An anchoring spike is provided between the capacitor body and the capacitor seal in the upper portion of the device to stabalize the device against vibration, and provide for gas expansion space. A thermally conductive material is preferably used in the bottom portion of the device as a combination anti-vibratory and thermally conductive medium.

THE DRAWINGS

DETAILED DESCRIPTION

Figure 1:
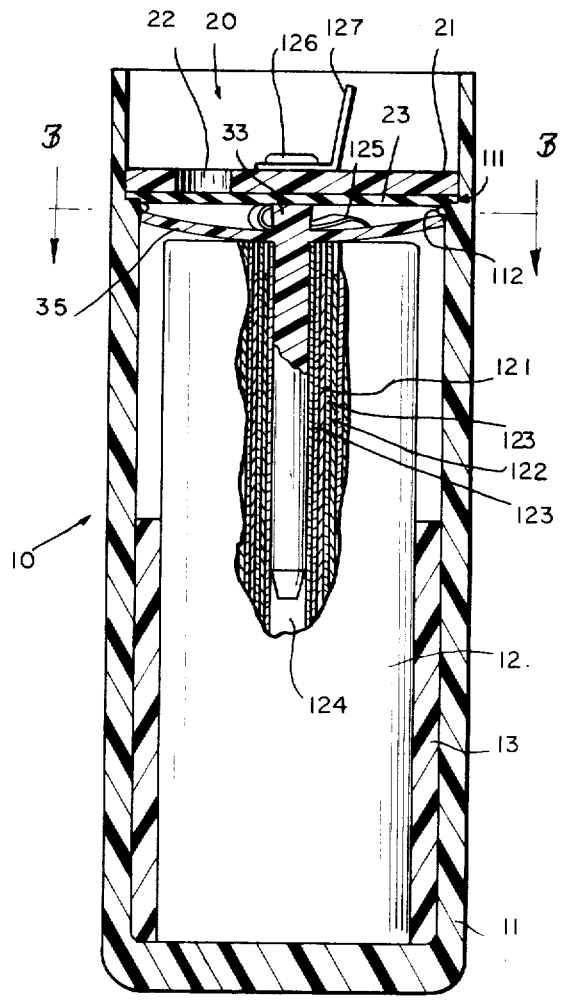
FIG. 1 is a sectional view of a capacitor in accordance with the present invention.

As can be seen from FIG. 1, the electrical capacitor of the present invention 10 comprises a container or can 11 made of metal, metal alloy or thermo-plastic material. It is preferably made of thermo-plastic material for reasons of economy and ease of manufacture. However, for construction where the can must be a part of the circuit, obviously a metal or metal alloy having sufficient electrical conductivity will be utilized for the can 11. Placed within the container 11 is a capacitor body 12. The capacitor body 12 preferably comprises a plurality of metal electrodes 121 and 122 having spacer members 123 placed there between. These spacers members are preferably impregnated with a liquid electrolyte of known composition.

At the bottom portion of the container there preferably is provided a thermally conductive and anti-vibratory medium 13 to reduce or avoid vibration of capacitor body 12 with respect to container 11. Also heat developed in the capacitor body may be transmitted through this material and through container 11 to the atmosphere. Examples of suitable materials include potting compositions, tar and asphalt. Also thermally conductive polymeric materials may be utilized to the extent that they are economically feasible.

At the upper portion of the container 11 means are provided for seating a seal member 20 thereon. The means may comprise a shoulder such as illustrated at 111 or a pinch or crimp in container 11. The seal member 20 comprises a relatively rigid upper member 21 made for example of metal or thermal plastic material such as a phenolic resin. If desired one or more vent holes 22 may be provided therein. The seal further includes a lower member 23 made of elastomeric material such as natural or synthetic rubber. If desired it may be pierced partially or all the way through in the vicinity of vent hole(s) 22. However, for many applications it need not be pierced and if sufficiently high pressures are reached in the device the pressures will pierce the elastomeric material, giving the desired venting to the atmosphere rather than an explosion.

Between the capacitor body 12 and the seal 20 a special anti-vibratory element or spike 30 is placed there between. As can be seen from FIG. 2 the anti-vibratory element 30 comprises a rod or stem portion 31 having a pointed or apex portion 32 which is preferably of reduced diameter or cross-sectional area to aid in placement of the spike within the opening 124 in body portion 12.

The stem portion also includes an upper extension 33 which functions to provide additional vent space when the device is placed in engagement with the seal member 20 as shown in FIG. 1.

The anti-vibratory element also includes a plurality of lobes 34 and 35, which may be of the same or different shape (the later being illustrated in the drawings).

The anti-vibratory element is made of resilient plastic material. As can be seen in FIG. 1, the lobes 34 and 35 engage the wall portion of the container 11 and are concave upwardly because they have slightly larger diameter than the container 11. Obviously for non-cylindrical devices the shape of the lobes would be appropriately altered, but one dimension would still be slightly larger to obtain firm engagement. The lobes together with the extension 33 act to hold the capacitor body 12 in firm engagement with the bottom of the can and from lateral movement. It is preferred that the container have a rib 112 to be engaged by the lobes to provide firm anchoring.

Figure 3:
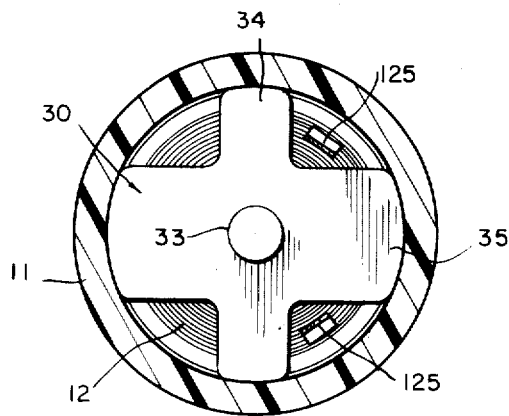
FIG. 3 is a sectional view from the top along the line 3—3 in FIG. 1.

As can be seen from FIG. 3 one or more tabs and/or leads may be passed between the lobes 34 and 35 and up to the seal member 20 in accordance with the conventional construction. As can be seen in FIG. 1 a tab 125 is shown in engagement with a rivet member 124.

Figure 2:
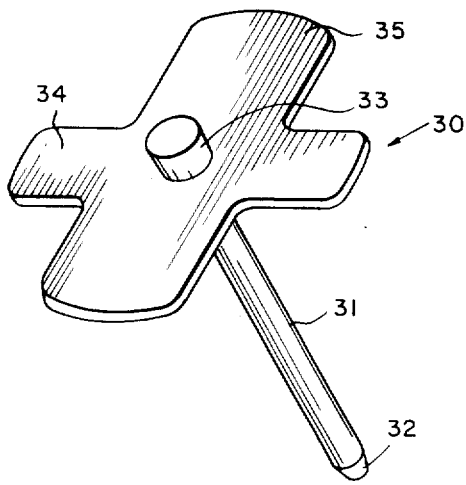
FIG. 2 is a view of an exemplary anchoring spike which may be utilized in accordance with the present invention.

While two such tabs are illustrated in FIG. 3, it will be apparent that at least two additional tabs may be utilized in accordance with the construction shown in FIGS. 2 and 3. Furthermore, the number of lobes may vary as desired and a sufficient number of tabs may be provided for any number of connections as desired. Furthermore, if desired, holes could be provided in the lobes and the tabs passed therethrough. Also a metal can may be utilized and one connection made from the bottom portion of the can, as is conventional in the art for many constructions.

In assembling the device the tab or tabs are first welded or otherwise afixed to the rivet or other connector member 126 and then the anti-vibratory heat conductive medium 13 is placed in the container in a flowable state. Then the anti-vibratory member 30 is placed in the opening 124 in the capacitor body 12 and the entire assembly is placed in the container. The medium 13 along the sides of the capacitor body and the container and solidify and/or harden as illustrated. Appropriate deminsions will automatically fix the lobes 34 and/or 35 in the appropriate position below seal member 20.

What is claimed is:

1. An electrolytic capacitor having improved resistance to vibration comprising:
   a container having at least one opening therein;
   a capacitor body located within said container, said body having an opening at least at one end thereof;
   said container having a seal member closing said opening;
   said capacitor body having at least one tab or lead which extends through said seal member;
   an anti-vibratory element located between said capacitor body and said seal comprising an elongated stem member, at least a portion of which is located within said opening within said capacitor body;
   said anti-vibratory element having a plurality of lobes which engage the walls of said container;
   said anti-vibratory element acting to urge said capacitor body into engagement with the bottom of said container and restrain movement of said capacitor body with respect to said container; and
   means for electrically connecting said capacitor body into an electrical circuit.

2. A capacitor according to claim 1 wherein a heat conductive and anti-vibratory medium is located between said capacitor body and said container in the lower portion of the capacitor device.

3. A capacitor according to claim 1 wherein said anti-vibratory element also has an upper stem portion which engages the bottom of said seal member.

4. A capacitor according to claim 1 wherein means for electrically connecting said capacitor body into a circuit extend from the inner side to the outer side of said lobes.

5. A capacitor according to claim 1 wherein said anti-vibratory element is made of plastic.

6. A capacitor according to claim 1 wherein said container has a ridge portion for locating said seal member in the upper portion of said container.

7. A capacitor according to claim 1 wherein said container is made from a material selected from the group consisting of metals, alloys and plastic materials.

8. A capacitor according to claim 1 wherein said stem has a locating portion having a reduced cross-sectional area.

9. A capacitor according to claim 8 wherein said cross-sectional area is circular.

10. A capacitor according to claim 1 wherein said lobes are concave outwardly from said capacitor body.

11. A capacitor according to claim 6 wherein said container is made of metal and is a part of the electrical circuit.

12. A capacitor according to claim 6 wherein said lobes engage said ridge within the container.

* * * * *